Aug. 25, 1964    E. P. BULLARD III, ETAL    3,145,577
SEMI-AUTOMATIC CONTROL FOR MACHINE TOOLS
Filed April 24, 1961    4 Sheets-Sheet 1
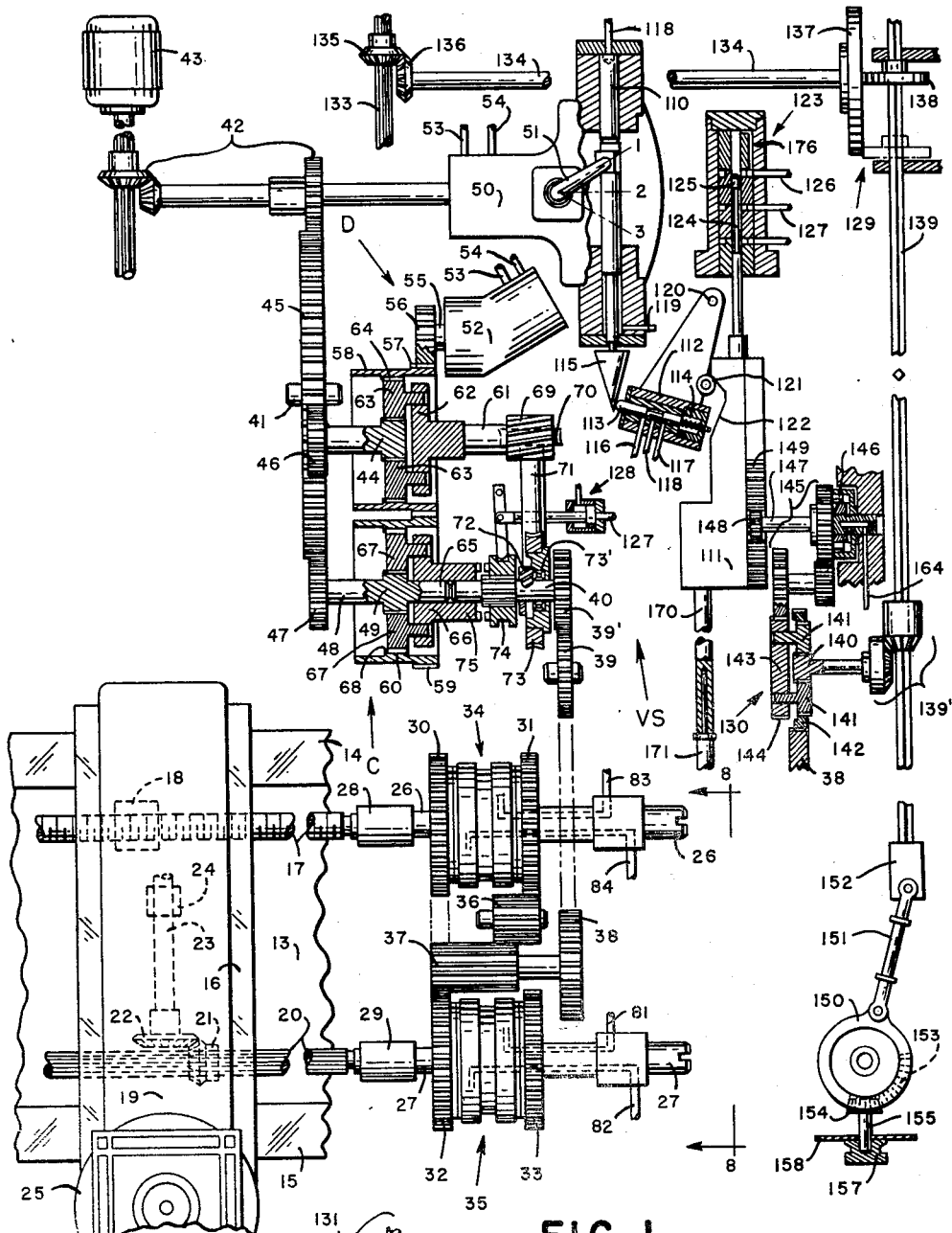
FIG.1
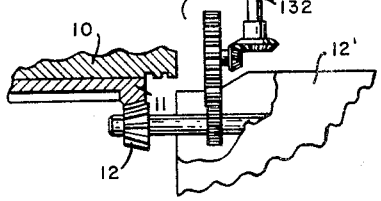
INVENTORS.
EDWARD P. BULLARD III
EDWARD P. BULLARD IV
ATTORNEY.

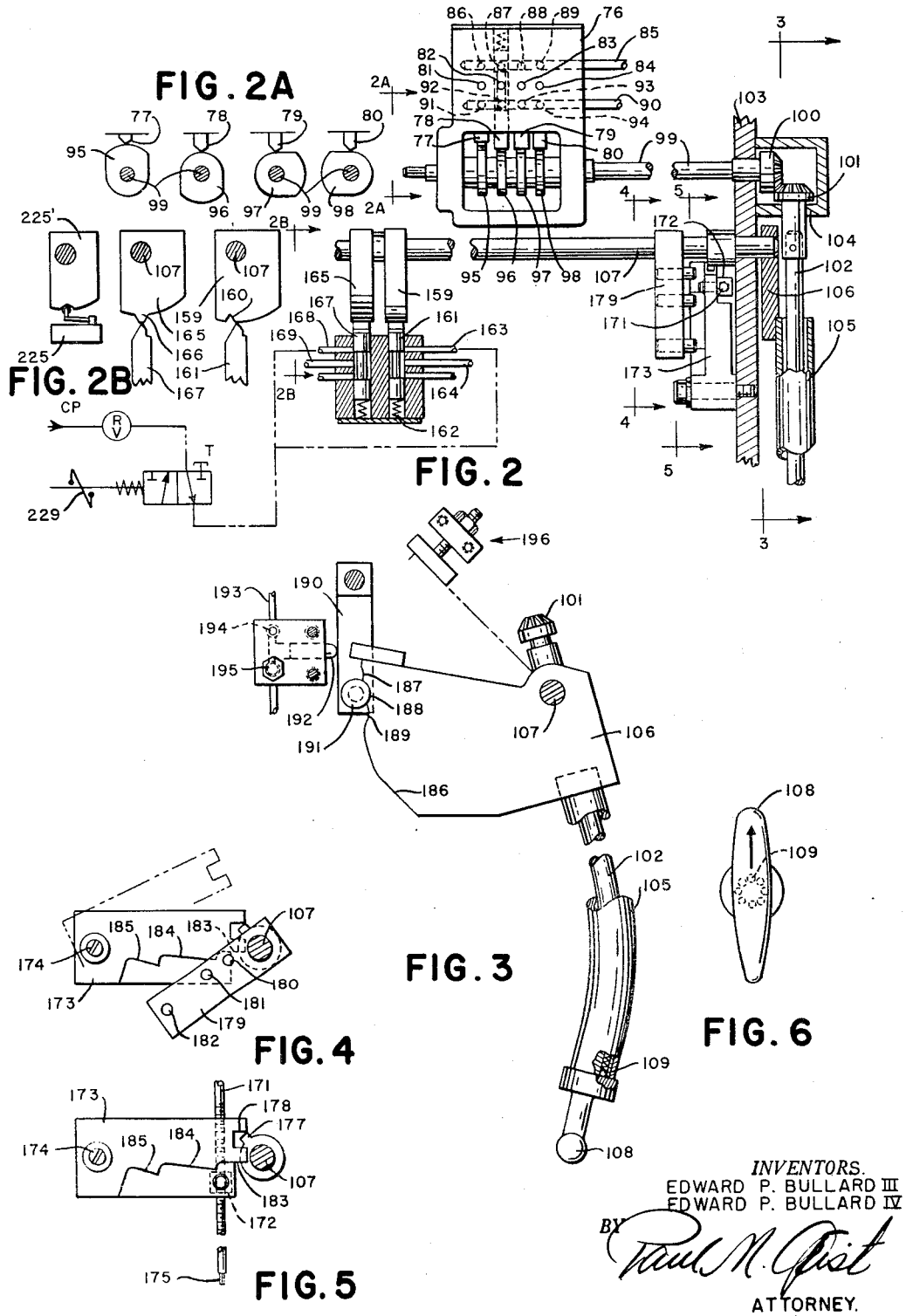

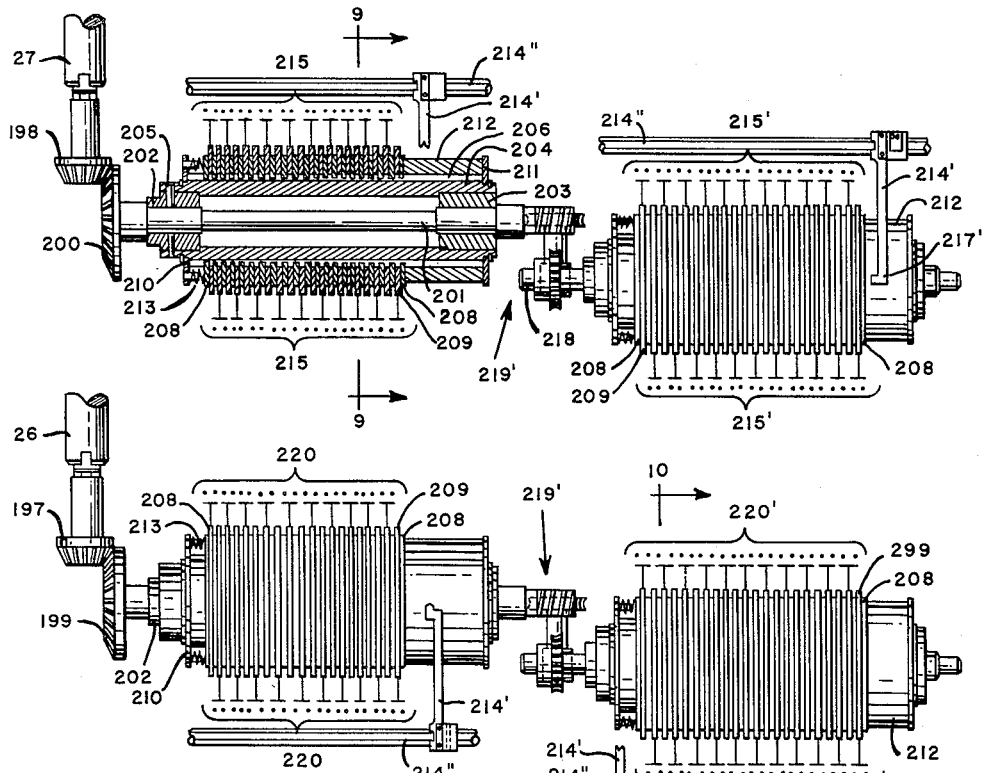
FIG. 8
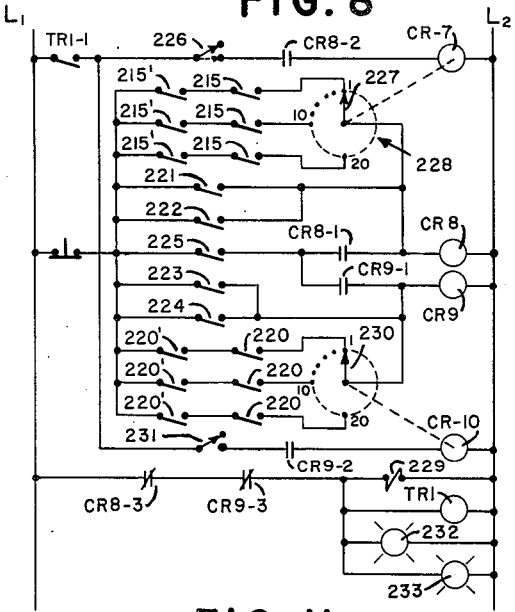
FIG. 11
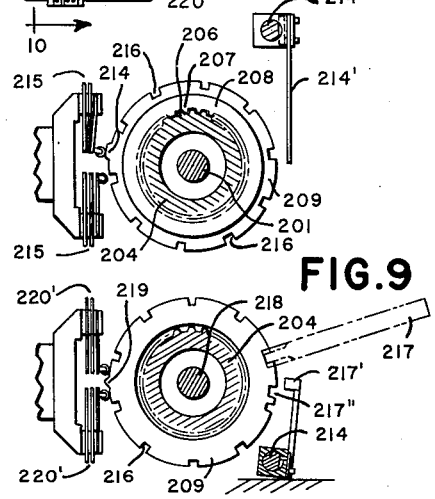
FIG. 9
FIG. 10
INVENTORS.
EDWARD P. BULLARD III
EDWARD P. BULLARD IV
ATTORNEY.

United States Patent Office 3,145,577
Patented Aug. 25, 1964

3,145,577
SEMI-AUTOMATIC CONTROL FOR
MACHINE TOOLS
Edward P. Bullard III, Cherry Lane, and Edward P.
Bullard IV, 220 Birch Road, both of Fairfield, Conn.
Filed Apr. 24, 1961, Ser. No. 104,905
13 Claims. (Cl. 74—335)

The present invention relates to controls, and particularly to a new and improved semi-automatic control for a machine tool.

Although the principles of the invention are applicable to various types of machine tools, they will be shown and described as applied to a lathe.

The principal object of the invention is to provide a manually controlled machine tool with a relatively large number of separate devices, each adapted to control the duration of a separate function of the machine tool.

Another object of the invention is to provide such a machine tool in which a next succeeding separate device is automatically rendered effective upon the completion of the last preceding function of the machine tool.

Still another object of the invention is to provide such a control for a machine tool which involves a preset series of separate devices for determining the extent of movement of a movable member, and in which the direction and speed of movement of the member is under the control of the operator of the machine tool.

Still another object of the invention is to provide such a control in which separate devices are arranged in series relation for each function so that a coarse and/or fine adjustment relative to the termination of a function may be effected.

In one aspect of the invention, a tool supporting head of a machine tool may be moved in either direction along intersecting paths of motion by a variable speed feedworks transmission that can be caused to rotate a separate shaft for each path of motion. The feedworks may be controlled by manually operable means for selecting the path, direction and speed of travel of the tool supporting head.

In another aspect of the invention, each shaft may be connected to a drum that supports a large number of disks, each disk being separately adjustable.

In still another aspect of the invention, another drum of an equal number of separately adjustable disks may be drivingly connected to the first-mentioned drums through a high gear reduction in the order of 100:1. Switches may be provided for each disk, and those for corresponding disks of the two connected drums of disks may be wired in series so that coarse and fine adjustments may be effected. Each disk may include a switch actuator for tripping its corresponding switch.

In still another aspect of the invention, an electrical distributor may be wired into the circuits including the switches, and it may be operated by a solenoid that is energized at the termination of each function.

The above, other objects and novel features of the invention will become apparent from the following specification and accompanying drawings which are merely exemplary.

In the drawings:

FIG. 1 is a front elevational view of a portion of a machine tool to which a schematic showing of the principles of the invention are applied;

FIG. 2 is a sectional schematic view of certain of the components forming the control for the apparatus shown in FIG. 1;

FIG. 2A is a view of the cams on shaft 99 of FIG. 2 in another plane;

FIG. 2B is a view of the cams on shaft 107 of FIG. 2 in another plane;

FIG. 3 is a view taken substantially along line 3—3 of FIG. 2, but rotated through 90°;

FIG. 4 is a view taken substantially along line 4—4 of FIG. 2;

FIG. 5 is a view taken substantially along line 5—5 of FIG. 2;

FIG. 6 is an end view of the control lever of FIG. 3;

FIG. 8 is a view looking in the direction of the arrows along line 8—8 of FIG. 1, showing in stretchout arrangement, certain apparatus (not shown in FIG. 1) to which the principles of the invention have been applied;

FIG. 9 is a sectional elevational view taken substantially along line 9—9 of FIG. 8;

FIG. 10 is a sectional elevational view taken substantially along line 10—10 of FIG. 8; and FIG. 11 is a wiring diagram for the invention.

Figure 7:
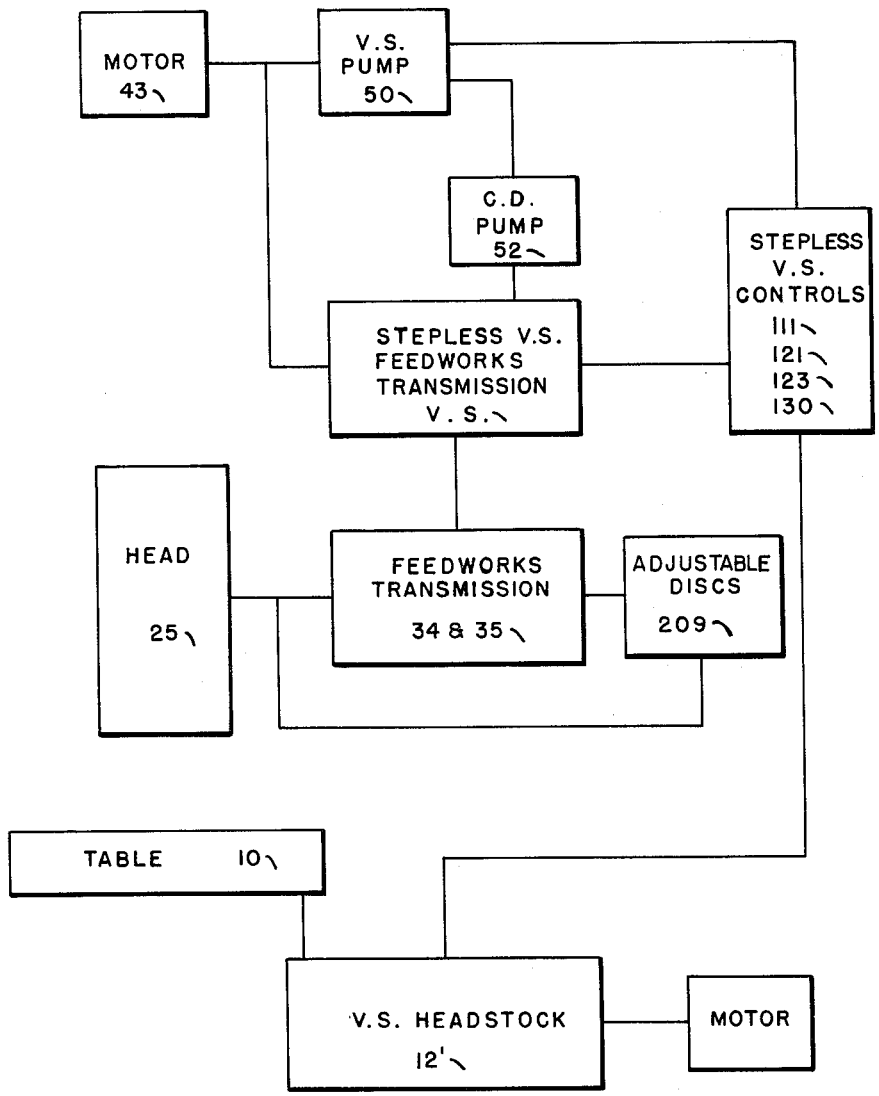
FIG. 7 is a block diagram of the various components shown in FIGS. 1 to 6.

Although the principles of the invention are applied to any type of feedworks, they are shown and will be described as applied to a feedworks shown, described and claimed in application Serial No. 26,783, filed May 4, 1960, in the name of Edward P. Bullard III, now Patent No. 3,074,295, issued January 22, 1963.

Referring to FIG. 1, the principles of the invention are shown as applied to a lathe, in which only those elements are shown that are necessary to an understanding of the invention. A work supporting table 10 may include a bevel gear 11 fixed to it that may be driven by a bevel pinion 12. The bevel pinion 12 may be driven at different rates of speed by variable speed means 12' which per se forms no part of this invention. This variable speed means may be of the conventional gear shifting type or otherwise. A base (not shown) may support the table 10 as well as a cross rail 13 in position relative to said table to permit one or more tool holders to be moved into engagement with work held on the table 10. The cross rail 13 may include ways 14, 15 along which a saddle 16 may be reciprocated by the rotation of a screw 17 that cooperates with a non-rotatable nut 18 fixed to the back of saddle 16. A tool slide 19 may be mounted on the saddle 16 for reciprocating movement along ways on saddle 16 at right angles to the ways 14, 15. This may be accomplished by the provision of a rotatable splined shaft 20 on which a bevel pinion 21 is splined. The pinion 21 may be mounted for rotation on, and within a cored-out portion of the saddle 16, and may mesh with a corresponding bevel pinion 22 that is likewise mounted for rotation on the saddle 16. The pinion 22 may be fixed to a rotatable screw 23 that is threaded into a nut 24 that is fixed to the slide 19. From the foregoing it is evident that rotation of screw 17 in both directions will cause reciprocation of saddle 16 and with its slide 19 along ways 14, 15 of cross rail 13. And, rotation of splined shaft 20 in both directions will cause reciprocation of slide 19 along a path at right angles to the ways 14 and 15. The slide 19 may support a tool holder 25 to which tools can be fixed for cooperation with work held on the table 10.

The rotation of screw 17 and splined shaft 20 in both directions may be effected by the transmission of power through a feed bracket including parallel shafts 26 and 27 that, respectively, may be connected to screw 17 and splined shaft 20 by couplings 28 and 29. The shafts 26 and 27 may support two gears each, 30, 31, 32 and 33, for free rotation. A fluid-operated clutch 34 may be located between gears 30 and 31 to selectively connect either to shaft 26; and, a similar clutch 35 may be located between gears 32 and 33 to selectively connect gears 32 and 33 to shaft 27.

A pair of elongated overlapping and intermeshing gears 36 and 37 may be mounted in such a manner relative to gears 30, 31, 32 and 33 that gears 30 and 32 mesh with gear 37, while gears 31 and 33 may mesh with gear 36. Gears 30 and 33 are shown in a stretch-out, unmeshing position for clarity. From the foregoing it is evident that the rotation of gear 37 will cause gears 30 and 32 to rotate in the same direction, and by virtue of gear 36, will cause gears 31 and 33 to rotate also in the same direction but reversely relative to the rotation of gears 30 and 32. Accordingly, shifting of clutch 34 between its limits of motion will cause rotation of screw 17 in both directions; and shifting of clutch 35 between its limits of motion will cause rotation of splined shaft 20 in both directions.

Power may be supplied to the gear 37 through gears 38 and 39, the latter of which may be connected to a gear 39' fixed to the output shaft 40 of a variable speed transmission VS.

Referring to FIG. 1, an input shaft 41 having a gear 45 fixed thereto may be connected by suitable means such as gearing 42 to a prime mover such, for example, as a constant speed A.C. motor 43. The input shaft 41 may be connected to a first element of an epicyclic gearing arrangement D located in one path of power flow. In the embodiment disclosed, the shaft 41 is shown as connected to a sun gear 44 through gearing 45 and 46, although it is evident that any one of the three power transmitting elements of the epicyclic gearing arrangement D could have been selected.

Spur gearing including gears 45 and 47 are shown as driving a shaft 48 from shaft 41 in the same direction as gear 46 is driven from shaft 41, although the direction of rotation of shaft 48 relative to gear 46 is immaterial as will be explained hereinafter. The shaft 48 is connected to a first element of another epicyclic gearing arrangement C located in another path of power flow. While the shaft 48 may be connected to any one of the three power transmitting elements of the arrangement C, it is shown as being connected to a sun gear 49 thereof.

The motor 43 is also connected directly to a positive displacement variable volume hydraulic unit 50, the variable displacement of which can be changed by the movement of a lever 51 between two limiting positions at which the unit 50 delivers liquid under pressure at maximum capacity in opposite directions of flow. When the lever 51 is at its midpoint of movement, no fluid is delivered by the unit 50.

The unit 50 may be of any positive displacement variable capacity type and it may be connected to a positive displacement non-variable hydraulic unit 52 within a closed circuit including lines 53 and 54. The unit 52 may be connected to a shaft 55 that supports a gear 56 in mesh with a gear 57 mounted on a second element 58 of the epicyclic gearing arrangement D. Gear 57 may mesh with a gear 59 on a second element 60 of the epicyclic gearing arrangement C.

From the foregoing it is evident that the hydraulic units 50 and 52 comprise a variable speed device that is connected to a second element of each of the epicyclic arrangements D and C. While a hydraulic steplessly variable speed device driven from the motor 43 has been disclosed, it is to be understood that the variable speed device need not be of the stepless variety, of the hydraulic type, nor be driven by the motor 43. It may comprise any form of variable speed device that can be adjusted in two directions throughout its range of speed variation. It may be driven by an external source of power, although when so driven, under certain circumstances a loss of feedback power is experienced which latter can be utilized to advantage to a certain degree and under certain conditions of operation when the variable speed device is driven from the input shaft 41.

The second elements 58 and 60 of the arrangements D and C are shown as being rotated in opposite directions, but this is only exemplary and not to be considered as a limitation. The only reservation is that rotation of the first and second elements of each of the arrangements C and D should be such that as the variable speed device 50, 52 is operated to increase or decrease in speed, the speed of rotation of the third power transmitting element of one of the arrangements C or D increases while the speed of the third element of the other decreases.

In the embodiment disclosed, the third element of the arrangement D may comprise a shaft 61 having an arm 62, to each of the outer ends of which a planet gear 63 is journaled. The planet gears 63, of course, mesh with the sun gear 44 as well as internal gear teeth 64 of the second element 58 of the ararngement D.

The third element of the C arrangement may comprise a shaft 65 similar to shaft 61 and having an arm 66 journaling planet gears 67 that mesh with the sun gear 49 and the internal gear teeth 68 on the second element 60.

Dissimilar ratio gearing may be provided between the shafts 61, 65 and the output shaft 40. This gearing may comprise worm 69 fixed to shaft 61 that meshes with a worm gear 70 fixed to a shaft 71; a worm 72 fixed to shaft 71 may mesh with a worm gear 73 mounted on shaft 40 with an overriding clutch 73' therebetween for a purpose to be described later. A clutch element 74 may be splined to shaft 40 and it may cooperate with clutch engaging means on a clutch element 75 fixed to shaft 65 in a manner presently to be described.

The hydraulic unit 50 is adapted to drive shaft 55 at a maximum speed in one direction at a 1:1 ratio, when its lever 51 is in the number 1 position, and to drive shaft 55 at a maximum speed in the opposite direction at a 1:1 ratio when lever 51 is in its number 3 position. When lever 51 is in its number 2 position, shaft 55 is not driven by unit 50. With the shaft 55 rotating at a maximum speed in either direction, the reactors 58 and 60 are rotating in opposite directions at maximum speed. Since the sun gears 44 and 49 are rotating in the same direction, it is evident that the shaft 61 or 65 of the epicyclic gearing arrangements D or C, the reactor of which is rotating oppositely to its sun gear, will rotate at a speed below base speed of its corresponding arrangement, while the other shaft of the two will be rotating at a speed above base speed. Assuming that the arrangement D is the one in which its reactor 58 rotates oppositely to its sun gear 44 when lever 51 is in its number 1 position, if the proper gear ratios and the proper speed of shaft 55 are employed, shaft 61 can be standing still when reactor 58 is rotating at the proper speed incident to lever 51 being in its number 1 position.

With clutch 74 in the position shown in FIG. 1, and moving lever 51 toward its number 2 position, the speed of shaft 40 will increase, through the action of overriding clutch 73', steplessly from zero to a speed coincident with the lever 51 arriving at its number 2 position where reactor 58 is stopped and shaft 61 is rotating at the base speed of the arrangement D. Continued movement of lever 51 toward its number 3 position causes reactor 58 to increase in speed from zero, but in a direction reversely to that in which it was rotating during the period when lever 51 was moved from its number 1 to its number 2 position. Expressed differently, reactor 58 now rotates in the direction of its sun gear 44. This, of course, causes shaft 61 and shaft 40 to increase in speed to a maximum for the transmission of power through the D epicyclic gearing arrangement.

When lever 51 is at its number 3 position, the reactor 60 is rotating in a direction opposite to its sun gear 49 and at a maximum speed so that shaft 65 is rotating at a speed below the base speed of the epicyclic gearing arrangement C. By employing the proper gear ratio between shaft 61 and shaft 40, the speed of shaft 65 can be slightly greater than the speed of shaft 40 when lever 51 is in its number 3 position so that clutch 74 can be shifted into engagement with clutch element 75 without tooth-on-tooth engagement, the overriding clutch permitting shaft 40 to be rotated at the slightly greater speed of shaft 65.

Movement of lever 51 from its number 3 position to its number 2 position causes reactor 60 to decrease in speed to a stopped condition and consequently causes a stepless increase in speed of shaft 65 and shaft 40. Movement of lever 51 to its number 1 position, of course, reverses the rotation of reactor 60 causing the speed of shafts 65 and 40 to continue to increase to the top limit of the epicyclic gearing arrangement C.

By employing a relatively high gear ratio between shaft 61 and shaft 40, and a direct connection between shaft 65 and shaft 40, during initial movement of lever 51 from its number 1 position to its number 3 position and with clutch 74 in neutral, the speed of shaft 40 can be steplessly varied over a relatively small range of speeds, i.e., speeds from 0 to about 23 r.p.m. And, during movement of lever 51 from its number 3 to number 1 position with clutch 74 clutched to element 75, the speed of shaft 40 may be steplessly varied from 23 r.p.m. to about 950 r.p.m. Accordingly, the low range of 0 to 23 r.p.m. as well as the lower end of the high range may be utilized for feed movements of the tool, and the range of 0 to 950 r.p.m. may be utilized for traverse speeds of the tool. These speeds of shaft 40 are merely one example that results from the selection of certain gear ratios. It is, of course, understood that any desired low and high speed range can be achieved by the proper selection of gear ratios.

In order to operate the feedworks transmission to cause movement of the tool support in either direction along either of its paths of motion and at any predetermined feed or traverse speed, a control for the feedworks is provided. While this control may take the form of that shown, described and claimed in application Serial No. 37,677, filed June 21, 1960, now Patent No. 3,028,768, issued April 10, 1962, in the name of Edward P. Bullard III, it will be shown and described as that covered in the application Serial No. 26,783 previously referred to. Referring to FIG. 2, the control may include a valve body 76 having four reciprocable valve spools 77, 78, 79 and 80 therein. The valve body may include four ports 81, 82, 83 and 84 that lead to the clutches 34 and 35 (FIG. 1). A common inlet line 85 may have four ports 86, 87, 88 and 89 in line, respectively, with ports 81 to 84, inclusive. A common exhaust line 90 may have four ports 91, 92, 93 and 94 in line, respectively, with ports 81 to 84 inclusive. Each spool 77, 78, 79 and 80 may be spring-urged downwardly onto separate cams 95, 96, 97 and 98 on a cam shaft 99. With the spools in their lower positions, the ports 81 to 84, inclusive, are connected to the exhaust line 90, and when any of said spools is in its upper position, its corresponding port 81 to 84 is connected to the pressure inlet line 85. Movement of the spools is, of course, effected by the oscillation of the cam shaft 99. It may have fixed to its one end a bevel gear 100 that meshes with a bevel gear 101 fixed to one end of a flexible shaft 102. The bevel gears 100 and 101 are journaled in bearings within fixed walls 103 and 104. The flexible shaft 102 may extend through a tubular arm 105 that is provided with a support 106. The support 106 may be fixed to a cam shaft 107 parallel with cam shaft 99.

The end of the flexible cable 102 opposite that connected to the bevel gear 101 may be connected to a hand grip 108 that is journaled in the end of arm 105 opposite that supporting plate 106. A spring pressed detent 109 may be provided for maintaining hand grip 108 in any rotary position to which it is moved. From the foregoing it is evident that turning of hand grip 108 turns cam shaft 99 and consequently actuates spools 77 to 80. Furthermore, it will be apparent that with the hand grip in the position shown in FIG. 3 and FIG. 6, spool 77 is raised providing communication from line 85, through port 81 to clutch 35 (FIG. 1), rendering gear 33 effective upon the admission of pressure fluid in line 85 as will be explained later. Each successive movement of hand grip 108 through 90° from the position shown in FIG. 6 in a clockwise direction will successively raise spools 79, 78 and 80, thereby rendering gears 31, 32 and 30 effective. Additionally, each 45° movement of hand grip 108 in a clockwise direction from any of the 90° positions will cause two of the spools to raise, thereby causing the movement of the tool support 25 along 45° paths. Thus, turning hand grip 108 clockwise 45° from the position shown in FIG. 6 will cause spools 77 and 79 to be raised, thereby rendering effective gears 33 and 31 (FIG. 1) upon the admission of pressure fluid to line 85.

Referring to FIG. 1, in order to control the flow of power through the variable speed transmission VS, means may be provided for moving the lever 51 between its various positions. In the embodiment disclosed, this means may comprise a reciprocable piston 110 that is connected to the lever 51. The movement of piston 110 may be effected by a servomechanism including a reciprocable cam 111 and a servo valve 112. The servo valve may include a spool 113 that is resiliently urged by a spring 114 into engagement with a cam 115 fixed to the one end of piston 110. Constant pressure and exhaust lines 116 and 117 are connected to the valve 112 such that the spool 113 blocks both when in its normal position or the position to which it returns after being displaced. Another line 118 is connected to valve 112 between the lines 116 and 117. Line 118 leads to the top of piston 110. A constant pressure line 119 continuously acts on piston 110 tending to return it to the position shown in FIG. 1; however, the area of piston 110 acted upon by pressure fluid from line 119 is less than that acted upon by pressure fluid from line 118 so that the latter overcomes the former when it is effective.

The valve 112 may be pivotally mounted at 120 and it may include a cam roller 121 that follows a cam surface 122 on cam 111. With the parts in the condition shown in FIG. 1, the lever 51 is in its number 1 position, and the units 50 and 52 are rotating at maximum speed in one direction. Movement of the cam 111 upwardly will cause the valve 112 to pivot counterclockwise about pivot 120 by the action of spring 114 expanding. This causes spool 113 to move leftwardly, establishing communication between lines 116 and 118 while maintaining exhaust line 117 closed. Accordingly, pressure liquid in line 118 forces piston 110 downwardly, moving arm 51 from its number 1 position toward its number 2 position until cam 115 forces spool 113 rightwardly to cut off communication between lines 116 and 118, at which point the pressure liquid within line 118 and above piston 110 is trapped, holding piston 110 and arm 51 in its new position.

As previously described, this causes the speed of the reactor 58 to decrease and that of the shaft 40 to increase from zero. Further upward movement of cam 111 causes the arm 51 to be moved downwardly through its number 2 position, thence to its number 3 position, at which point the follower roll 121 is at the low point of cam path 122 and the reactor 58 is rotating in a reverse direction at maximum speed. It is at this point that, due to the reduction gearing 69, 70, 72 and 73, shaft 40 has increased in speed from zero through its low speed range, and reactor 60 is conditioned to take over for the high speed range of operation of shaft 40. The arrangement is such that arm 66 is rotating at a speed slightly greater than that of shaft 40 so that clutch 74 can be shifted without tooth-on-tooth contact. Shifting of clutch 74 at the proper time is accomplished by a valve 123 having a valve stem 124 connected to the cam 111. When cam 111 is at a position in its upward travel such that the roll 121 is at the low point of cam surface 122, the head 125 of stem 124 establishes communication between lines 126 and 127, whereupon piston device 128 shifts clutch 74 into engagement with clutch element 75. Immediately, the faster rotating arm 66 takes over from the gear 73 because of the overriding clutch 73'.

Further upward movement of the cam 111 causes the roller 121 and valve 112 to move clockwise about pivot 120, thereby forcing spool 113 rightwardly, establishing communication between lines 118 and exhaust line 117, while still retaining line 116 blocked off. Accordingly, piston 110 begins to raise due to the pressure liquid in line 119 until cam 115 permits spool 113 to move leftwardly enough to close off exhaust line 117. This action of moving cam 111 upwardly may continue until arm 51 has returned to its number 1 position when shaft 40 is rotating at its maximum rate of speed.

Movement of the cam 111 downwardly from its uppermost position causes the shaft 40 to reduce in speed to zero when cam follower 121 is in the position shown in FIG. 1.

The reciprocation of the cam 111 during a metal removal operation of head 25 preferably should be related to the speed at which the table 10 is rotated by the conventional variable speed transmission 12'. During traverse movement of head 25, the movement of cam 111 should preferably be unrelated to the rotation of table 10. In the present embodiment, the function of relating head movement to table rotation has been accomplished by employing a servo drive 130 between the gear 38 and an auxiliary variable speed device 129 that is driven from the transmission 12' that drives the table 10. The servo drive 130 is in the form of an epicyclic gearing train.

The output shaft of the conventional variable speed transmission 12' drives a gear train 131 that in turn drives a shaft 132. The shaft 132 is connected to a shaft 133 that drives a shaft 134 through bevel gears 135 and 136. A flat disc 137 is fixed to shaft 134, and it frictionally drives a disc 138 that is fixed to a reciprocable shaft 139 having a square or splined cross section. With disc 138 in its solid line position at the center of disc 137, shaft 139 does not rotate. Movement of disc 138 toward its dot-and-dash position increases the speed of rotation of shaft 139 from zero to a maximum predetermined value.

The speed of rotation of shaft 139 is employed to drive, through bevel gearing 139', a sun gear 140 of the epicyclic gearing arrangement 130. The sun gear 140 meshes with planet gears 141 which in turn mesh with the internal teeth of a ring gear 142. The external teeth of ring gear 142 mesh with gear 38 that is driven from the output shaft 40 of the variable speed unit VS. The planets 141 are journaled in an arm 143 that drives through gear teeth 144 thereon, a gear train 145 including a hydraulically operable clutch 146. When the clutch 146 is effective, gearing 145 drives a shaft 147 to which is fixed a pinion 148 in mesh with a rack 149 integral with the cam 111.

With the parts in the condition shown in FIG. 1, the shaft 38 is not rotating, nor is shaft 139. Movement of disc 138 off its center position causes shaft 139 to rotate at a predetermined speed depending upon the distance that disc 138 is moved from center. Since gear 38 is not rotating, the rotation of sun gear 140 rotates arm 143 and hence shaft 147, provided, of course, that clutch 146 is effective. Rotation of shaft 147 may move cam 111 upwardly, thereby effecting the movement of lever 51 from its number 1 toward its number 2 position and hence starting the rotation of gear 38. When the speed of rotation of gear 38 arrives at a predetermined value, it will combine with the speed of rotation of the sun gear 140 and stop the rotation of arm 143. This, of course, stops the movement of cam 111 and also the movement of lever 51. By properly calibrating the offset positions of disc 138 with respect to the speeds of rotation of shaft 38, such positions can represent definite feed rates of movement of the head 25, each of which rates will be definitely related to the speed of rotation of the table 10.

Reciprocation of shaft 139 may be effected by connecting it to an oscillatable member 150 through a connecting rod 151 and a non-rotatable connector 152 that permits rotation of shaft 139. The member 150 may be provided with bevel gear teeth 153 that mesh with a bevel pinion 154 on a shaft 155 to which is fixed a knob 157 and a dial 158. The dial 158 may be marked to indicate the feed rates corresponding to the calibrated offset positions of disc 138.

From the foregoing it is evident that setting of dial 158 will cause head 25 to move at a predetermined feed rate related to the rotation of the table 10 when the clutch 146 is rendered effective.

Referring to FIGS. 2 and 3, arm 105 is adapted to be moved a short distance in a counterclockwise direction, thereby turning shaft 107 without turning shaft 99. The flexible cable 102 bends to accommodate this movement. A cam 159 on shaft 107 includes a notch 160 (FIG. 2B). When arm 105 is in its rightward position (FIG. 3), notch 160 permits a spool 161 to be moved upwardly by a spring 162, thereby permitting pressure fluid to flow from a line 163 through a line 164 to render effective clutch 146 (FIG. 1). Feeding motion of head 25 occurs along the path and in the direction represented by the position of handle 108, in one of its rotary positions which selectively activates one of the spools 77 to 80, inclusive. Another cam 165 on shaft 107 includes a rise 166 that cooperates with a spool 167 that is caused to raise when arm 105 is in its rightward "feed" position. This causes pressure fluid to flow from a line 168 through a line 169 to line 85, thereby rendering effective the selected clutch 34 or 35 to cause the head 25 to move in the selected direction at the selected feed rate.

As previously explained, movement of the head 25 at traverse rates of speed preferably should not be related to the rotation of the table 10. In the embodiment disclosed, this has been accomplished by providing a separate, mechanically operable actuator for moving cam 111 independently of the epicyclic control gearing 130. Referring to FIGS. 1, 4 and 5, a member 170 may be fixed to the cam 111 and it may make a telescopic connection with a rod 171. The rod 171 may be threadingly connected to a nut 172 which is pivotally mounted on a lever 173, which itself is pivotally mounted at 174. The threaded rod 171 may include a square end 175 to receive a wrench.

Referring again to FIG. 1, the constant pressure inlet 126 of valve 123 includes a pass 176 that causes the constant pressure liquid to act on the head 125 of the stem 124, constantly urging cam 111 and rod 171 downwardly. The cam shaft 107 may include a lug 177 which stops the downward movement of rod 171 when a point 178 on lever 173 engages it. The only time that point 178 engages lug 177 is when the arm 105 is in neutral. By adjusting the threaded rod 171 through the square end 175, a predetermined lower position of cam 111 can be provided for a purpose to be described later.

The cam shaft 107 may also include a lever 179 having three pins 180, 181 and 182 thereon. These pins are adapted, respectively, to cooperate with cam surfaces 183, 184 and 185 formed on lever 173 as will be explained. Movement of the arm 105 in a clockwise direction (FIG. 3) for the first five degrees occurs before the pin 180 engages surface 183 on lever 173. This movement of arm 105 may be employed to provide a "creep" speed of the head 25 as preset by turning the threaded rod 171. At neutral position of arm 105, the head 25 does not move because the spool 167 (FIG. 2B) is depressed, cutting off pressure fluid to lines 169 and 85. It is to be noted that a feed speed can be selected that is less than the preset "creep" speed since movement of the arm 105 rightwardly (FIG. 3) causes lug 177 (FIG. 5) to move counterclockwise away from the point 178, thereby permitting rod 171 to move downwardly if required for a feed rate that is less than the preset "creep" speed.

Movement of arm 105 in a clockwise direction (FIG. 3) after pin 180 engages surface 183 on lever 173, causes rod 171 and consequently cam 111 to move upwardly, thereby effecting the movement of arm 51 toward its number 2 position to increase the speed of gear 38 and hence the speed of movement of head 25. This movement of cam 111 is independent of the epicyclic gearing 130 since spool 161 (FIG. 2B) is depressed, exhausting clutch 146 (FIG. 1). Continued movement of arm 105 in a clockwise direction successively causes pins 181 and 182 to engage surfaces 184 and 185 on lever 173, thereby increasing the speed of head 25 to its maximum traverse rate.

In order to provide a degree of feel to the actuation of the arm 105, the support 106 may include a cam surface 186. It may include notches 187, 188 and 189 on its periphery. A pivoted lever 190 may include a roll 191 adapted to ride on the cam surface 186. A plunger 192 may be urged into engagement with lever 190 by a source of constant pressure liquid from a line 193, past a check valve 194. An adjustable needle valve 195 may be employed to exhaust the cylinder for pin 192 at a predetermined rate. The construction and arrangement of the parts are such that a definite resistance is felt when the arm 105 is in its "neutral," "feed" and "creep" positions. Furthermore, a controlled resistance to the increase in traverse speed of head 25 is felt by the controlled bleeding of the exhaust through the preset needle valve 195. An adjustable stop 196 may be provided for limiting the extent of clockwise movement of arm 105.

Referring to FIGS. 1 and 8, the shafts 26 and 27 are connected to bevel gears 197, 198 which mesh with bevel gears 199, 200. The gear 200 is connected to a shaft 201 having bosses 202 and 203 at each end thereof. A hollow cylindrical member 204 may be mounted on bosses 202 and 203, and a pin 205 may extend through the one end of member 204, boss 202 and shaft 201. The peripheral surface of member 204 is provided with splines 206 for receiving mating internal splines 207 (FIG. 9) of a plurality of spacer discs 208 mounted on member 204. Between succeeding discs 208, an additional disc 209 may be located. The disc 209 may have a central hole that clears the splines on member 204 and therefore may be rotated relative to it and discs 208.

Referring to FIG. 8, discs 210 and 211 may be fixed to opposite ends of the member 204. Depending upon the number of discs 208 and 209, a sleeve 212 may be located between disc 211 and the last of discs 208. Resilient means 213 may be located between disc 210 and the first of the discs 208. Accordingly, all of the discs are resiliently urged into abutting relation with each other. However, discs 209 can be turned relative to each other and the spacer discs 208. Each of the discs 209 may include a cam 214 adapted to actuate a switch 215. In order to conserve space, the switches 215 are arranged to extend alternately upwardly and downwardly as shown in FIG. 9. The remaining portions of the periphery of discs 209 may be provided with spaced notches 216 for receiving a tool 217 for turning the discs 209 containing the cams 214. Indicating means such as fingers 214' may be mounted for sliding motion on bars 214'' for facilitating the setting of discs 209. Also, a locator 217' may cooperate with a single notch 217'' which will locate its corresponding pointed cam 219 exactly on its corresponding switch 215'. The pitch of the screw 23 may be such that one revolution of shaft 20 moves head 25 one-half inch, for example. The ratio of gears 198, 200 may be 1:2 so that it will take two revolutions of splined shaft 20 to rotate shaft 201 one revolution, which would equal one inch of vertical movement of head 25. Accordingly, the described discs on shaft 201 represent a fine setting in which a small motion of head movement represents a fairly large peripheral movement of a cam 214. Consequently, the cams 214 are relatively long peripherally in order to facilitate setting them.

The shaft 201 may be geared to another shaft 218 through worm gearing 219', which in the embodiment disclosed will be described as being 100:1. The shaft 218 may support another series of discs 208, 209 in the same way that shaft 201 supports such discs. The discs on shaft 218, however, rotate only 1/100 as much as the discs on shaft 201, so that these latter discs represent a means for roughly setting the point of motion termination of head 25. Since a large movement of head 25 is represented by a very small movement of discs 209 on shaft 218, the cam 219 on discs 209 of shaft 218 is pointed so that it will facilitate its setting to the proper inch. In other words, if the cam 219 were not pointed but flat like cam 214, it would cover more than one inch movement of head 25.

There may be any number of switches 215, each having a corresponding disc 209 on shaft 201, and a corresponding number of switches 215' each having a corresponding disc 209 on shaft 218. The switches 215 and 215' are wired in series (FIG. 11), only three switches 215 and 215' being shown in FIG. 11.

There is an identical arrangement of discs 209 and 208 adapted to actuate switches 220 and 220' for shaft 26 connected to screw 17 for controlling the horizontal motion of head 25.

In order to limit the maximum motion of the head 25 horizontally and vertically, limit switches 221 to 224 may be provided, one at each end of the paths of travel of head 25. Furthermore, a switch 225 may be provided (see also FIG. 2B) which will be closed by a cam 225' on shaft 107 only when the lever arm 105 (FIG. 3) is in neutral position. Movement of arm 105 into feed or traverse position causes switch 225 to open.

Referring to FIG. 11, with switch TR1–1 closed, a switch 226 in its dotted line position, the arm 227 of the distributor 228 at its number 1 position and the number one discs 209 on shafts 201 and 218 for switches 215, 215' preset to stop the vertical motion of the head 25, movement of arm 105 (FIG. 3) with handle 108 in the position shown (up) opens switch 225 for a purpose to be described. The head 25 will move upwardly, at either feed or traverse depending upon the direction of movement of arm 105, until the cam 219 on the number one disc 209 on shaft 218 closes its corresponding switch 215'. In the meantime, the switch 215 corresponding to the number one disc 209 on shaft 201 will close at each revolution of this disc 209, but since it is in series with the corresponding switch 215', the CR8 relay will not be energized until both switches 215 and 215' are simultaneously closed. Of course, if the predetermined position of head 25 is not critical, the setting of the disc 209 on shaft 201 will not be critical.

When both switches 215, 215' are simultaneously closed, the CR8 relay is energized and contacts CR8–1 and CR8–2 close while contacts CR8–3 open. Opening CR8–3 contacts de-energizes solenoid 229 which exhausts the line 169 (FIG. 2) and line 85 to which it is connected so that upward motion of head 25 stops. Closing CR8–2 contacts energizes the CR7 relay, indexing distributor arm 227 to its next succeeding position, and this relay remains energized and does not reset itself until de-energizing of the CR8 relay which is held through CR8–1 contacts and switch 225 since the lever 105 is not in its neutral position. This arrangement insures that lever 105 must be returned to neutral before starting another motion of head 25 since solenoid 229 must first be energized by de-energizing CR8 relay to effect closing of CR8–3 contacts. Returning lever 105 to neutral opens switch 225, dropping out relay CR8; opening contacts CR8–2 to thereby effect resetting relay CR7; and closing contacts CR8–3 thereby energizing solenoid 229.

Should an operator leave the machine without returning arm 105 to neutral, after a predetermined time interval greater than that for the longest cut, TR1 relay will open contacts TR1–1 to de-energize relay CR7 to prevent it from burning out.

There may be another distributor 230 for switches 220, 220' that is controlled by the CR10 and CR9 relays and a manual switch 231. The switches 226 and 231 may be set in their solid line positions when it is desired to complete a motion without indexing the corresponding distributor to the next succeeding position. This enables an operator to check the preset position of discs 209 on shafts 201 and 218 for accuracy.

Indicating lights 232 and 233 may be located at different points on the machine which normally are illuminated but go out when the head 25 arrives at the point along its paths of motion where it is intended to be stopped.

From the foregoing it is evident that a predetermined program of functions may be prepared on a chart which the operator will follow in performing the required operations on a work piece. The discs 209 on shaft 201 and 218 for vertical motion, as well as those for horizontal motion may be preset for accurately stopping the motion of the head 25 along either of its paths to satisfy the charted program of functions. The operator need only return the distributors 228 and 230 to their number 1 positions and manually operate lever 105 and handle 108 in the sequence setup on the chart, and the head 25 will perform the desired functions, stopping accurately at the end of each function as the setting of discs 209 dictates.

Although the various features of the semi-automatic control have been shown and described in detail to fully disclose one embodiment of the invention, it will be evident that changes may be made in such details and certain features may be used without others without departing from the principles of the invention.

What is claimed is:

1. Apparatus comprising in combination, a member; engageable and disengageable means drivingly connected to said member for moving said member in either direction along a path of travel a plurality of times within a program of operations; control means connected to and movable in response to the movement of said member for terminating the movement of said member along said path of travel comprising a first set of separate presettable means, one for each movement of said member along its path of motion within said program, all of said presettable means being movable in proportion to the movement of said member; a second set of separate presettable means, one for each of the first mentioned presettable means; means for drivingly connecting said second set of presettable means to said first set but such that said second set is driven at a substantially slower speed than said first mentioned set; electrical switches for each corresponding presettable means in each set, wired in series relation with respect to each other; and distributor means connected to said switches for successively connecting said series arranged switches with means for disengaging the means that is drivingly connected to said member for causing the movement of said member.

2. Apparatus comprising in combination, a member; a transmission drivingly connected to said member for moving said member in either direction along a path of travel a plurality of times within a program; manually operable means for rendering effective the operation of said transmission and for selecting the direction of movement of said member along said path of travel, normally maintained in neutral; control means connected to and movable in response to the movement of said member for terminating the movement of said member along said path of travel comprising a first set of separate presettable means, one for each movement of said member along its path of motion within said program, all of said presettable means being movable in proportion to the movement of said member; a second set of separate presettable means, one for each of the first mentioned presettable means; means for drivingly connecting said second set of presettable means to said first set but such that said second set is driven at a substantially slower speed than said first mentioned set; electrical switches for each corresponding presettable means in each set, wired in series relation with respect to each other; distributor means connected to said switches for successively connecting said series arranged switches with means rendering ineffective said member moving transmission; and means for preventing the movement of said member until said manually operable means is returned to neutral between successive movements of said member.

3. Apparatus comprising in combination, a member; a transmission drivingly connected to said member for moving said member in either direction along intersecting paths of motion a plurality of times within a program; a presettable control connected to said transmission for determining the rate of movement of said member by said transmission; an oscillatable arm having a neutral position; means rendered effective when said arm is on one side of its neutral position for causing said member to be moved at a rate depending upon the preset adjustment of the control for said transmission; means rendered effective when said arm is on the other side of its neutral position for causing said member to move at a rate depending upon the position of said arm and independent of the control for said transmission; means associated with said arm for determining the path and direction of movement of said member; control means connected to and movable in response to the movement of said member for terminating the movement of said member along either of said paths of travel comprising a first set of separate presettable means for each path of motion, one for each motion of said member along said path within said program; a second set of separate presettable means for each path, one for each of the first mentioned presettable means; means for drivingly connecting the second set of presettable means for each path to its corresponding first set but such that said second set is driven at a substantially slower speed than the means of said first set; electrical switches for each corresponding presettable means in each set, wired in series relation with respect to each other; and separate distributor means connected to said switches for successively connecting said series arranged switches for each path of motion of said member to means for rendering ineffective said member moving transmission.

4. Apparatus comprising in combination, a member; a transmission drivingly connected to said member for moving said member in either direction along intersecting paths of motion a plurality of times within a program; a presettable control connected to said transmission for determining the rate of movement of said member by said transmission; an oscillatable arm having a neutral position; means rendered effective when said arm is on one side of its neutral position for causing said member to be moved at a rate depending upon the preset adjustment of the control for said transmission; means rendered effective when said arm is on the other side of its neutral position for causing said member to move at a rate depending upon the position of said arm and independent of the control for said transmission; means associated with said arm for determining the path and direction of movement of said member; control means connected to and movable in response to the movement of said member for terminating the movement of said member along either of said paths of travel comprising a first set of separate presettable means for each path of motion, one for each motion of said member along said path within said program; a second set of separate presettable means for each path, one for each of the first mentioned presettable means; means for drivingly connecting the second set of presettable means for each path to its corresponding first set but such that said second set is driven at a substantially slower speed than the means of said first set; electrical switches for each corresponding presettable means in each set, wired in series relation with respect to each other; separate distributor means connected to said switches for successively connecting said series arranged switches for each path of motion of said member to means for rendering ineffective said member moving transmission; and means for preventing the movement of said member until said oscillatable arm is returned to its neutral position between successive movements of said member.

5. Apparatus comprising in combination, a member; separate rotatable shafts drivingly connected to said member for moving said member along intersecting paths; a feedworks transmission connected to said shafts including reversing gearing for causing said shafts to rotate in opposite direction; a splined sleeve drivingly connected to each of said shafts; a plurality of discs splined to said sleeves; a plurality of discs alternating with said splined discs and having bores that clear the splines on said sleeves; resilient means for urging all of said discs in one direction to provide friction between alternate discs; another splined sleeve drivingly connected to each of said first-mentioned splined sleeves through gear reductions that cause said other splined sleeves to rotate at substantially slower speeds than said first-mentioned sleeves; disc arrangements on said other splined sleeves similar to those on said first-mentioned splined sleeves; switch actuating dogs on each of the non-splined dics; series arranged switches for corresponding non-splined discs for each of said shafts; distributor means connected to said series arranged switches for successively connecting said series arranged switches to means for rendering ineffective said feedworks transmission; and means responsive to the simultaneous closing of said series arranged switches for indexing said distributor means.

6. Apparatus comprising in combination, a member; separate rotatable shafts drivingly connected to said member for moving said member along intersecting paths; a feedworks transmission connected to said shafts including reversing gearing for causing said shafts to rotate in opposite directions; a splined sleeve drivingly connected to each of said shafts; a plurality of discs splined to said sleeves; a plurality of discs alternating with said splined discs and having bores that clear the splines on said sleeves; resilient means for urging all of said discs in one direction to provide friction between alternate discs; another splined sleeve drivingly connected to each of said first-mentioned splined sleeves through gear reductions that cause said other splined sleeves to rotate at substantially slower speeds than said first-mentioned sleeves; disc arrangements on said other splined sleeves similar to those on said first-mentioned splined sleeves; switch actuating dogs on each of the non-splined discs; series arranged switches for corresponding non-splined discs for each of said shafts; separate distributor means for successively connecting the series arranged switches for each shaft to means for rendering ineffective said feedworks transmission; and means responsive to the simultaneous closing of the series arranged switches for either shaft for causing its corresponding distributor means to be indexed.

7. Apparatus comprising in combination, a member; separate rotatable shafts drivingly connected to said member for moving said member along intersecting paths; a feedworks transmission drivingly connected to said shafts including reversing gearing for causing said shafts to rotate in opposite directions; manually operable means for controlling the rotation of said shafts, said means normally being maintained in neutral; a splined sleeve driven by each of said shafts; a plurality of discs splined to said sleeves; a plurality of discs alternating with said splined discs and having bores that clear the splines on said sleeves; resilient means for urging all of said discs in one direction to provide friction between alternate discs; another splined sleeve drivingly connected to each of said first-mentioned splined sleeves through gear reductions that cause said other splined sleeves to rotate at substantially slower speeds than said first-mentioned sleeves; disc arrangements on said other splined sleeves similar to those on said first-mentioned splined sleeves; switch actuating dogs on each of the non-splined discs; series arranged switches for corresponding non-splined discs for each of said shafts; distributor means connected to said switches for successively connecting said series arranged switches to means for rendering ineffective said feedworks transmission; means responsive to the simultaneous closing of said series arranged switches for indexing said distributor means; and means for preventing the movement of said member until said manually operable means is returned to neutral between successive movements of said member.

8. Apparatus comprising in combination, a member; separate rotatable shafts drivingly connected to said member for moving said member along intersecting paths; a feedworks transmission drivingly connected to said shafts including reversing gearing for causing said shafts to rotate in opposite directions; a presettable control connected to said feedworks transmission for determining the rate of movement of said member by said feedworks transmission; an oscillatable arm having a neutral position; means rendered effective when said arm is on one side of its neutral position for causing said member to be moved at a rate depending upon the preset adjustment of the control for said transmission; means rendered effective when said arm is on the other side of its neutral position for causing said member to move at a rate depending upon the position of said arm and independent of the control for said transmission; a splined sleeve driven by each of said shafts; a plurality of discs splined to said sleeves; a plurality of discs alternating with said splined discs and having bores that clear the splines on said sleeves; resilient means for urging all of said discs in one direction to provide friction between alternate diccs; another splined sleeve drivingly connected to each of said first-mentioned splined sleeves through gear reductions that cause said other splined sleeves to rotate at substantially slower speeds than said first-mentioned sleeves; disc arrangements on said other splined sleeves similar to those on said first-mentioned splined sleeves; switch actuating dogs on each of the non-splined discs; series arranged switches for corresponding non-splined discs for each of said shafts; distributor means connected to said switches for successively connecting said series arranged switches to means for rendering ineffective said feedworks transmission; means responsive to the simultaneous closing of said series arranged switches for indexing said distributor means; and means for preventing the movement of said member until said manually operable means is returned to neutral between successive movements of said member.

9. In an apparatus including a member adapted to be moved in either direction along intersecting paths of motion; a rotatable table in position relative to said member such that said member moves along planes including the axis of rotation of said table; a variable speed transmission drivingly connected to said table for rotating said table; separate rotatable shafts connected to said member for effecting the movement of said member; reversing gearing connected to said shafts for causing said shafts to rotate in opposite directions; a steplessly variable speed transmission connected to said reversing gearing for driving said reversing gearing, including a steplessly variable hydraulic transmission; a servomechanism connected to said hydraulic transmission for adjusting said hydraulic transmission, including a reciprocable cam; a variable speed control transmission drivingly connected to said table-rotating transmission; an epicyclic gearing train between the output of said control transmission and the output of said steplessly variable speed transmission for moving the cam of said servomechanism; means connected to said control variable speed transmission adapted to preset said control variable speed transmission for causing said servomechanism to adjust said hydraulic transmission; an oscillatable arm connected to said reversing gearing and said servomechanism, said arm having a neutral position; means rendered effective when said arm is on one side of its neutral position for causing said member to be moved at a rate depending upon the preset adjustment of said control variable speed transmission; means rendered effective when said arm is on the other side of its neutral position for causing said member to move at a rate depending upon the position of said arm and independent of said control variable speed transmission; a rotatable handle attached to said arm for determining the path and direction of movement of said member; a splined sleeve driven by each of said separate rotatable shafts; a plurality of discs splined to said sleeves; a plurality of discs alternating with said splined discs and having bores that clear the splines on said sleeves; resilient means for urging all of said discs in one direction to provide friction between alternate discs; another splined sleeve drivingly connected to each of said first mentioned splined sleeves through gear reductions that cause said other splined sleeves to rotate at substantially slower speeds than said first-mentioned sleeves; disc arrangements on said other splined sleeves similar to those on said first-mentioned splined sleeves; switch actuating dogs on each of the non-splined discs; series arranged switches for corresponding non-splined discs for each of said separate rotatable shafts; distributor means connected to said switches for successively connecting said series arranged switches to means for rendering ineffective said reversing gearing; and means responsive to the simultaneous closing of said series arranged switches for indexing said distributor means.

10. In an apparatus including a member adapted to be moved in either direction along intersecting paths of motion; a rotatable table in position relative to said member such that said member moves along planes including the axis of rotation of said table; a variable speed transmission drivingly connected to said table for rotating said table; separate rotatable shafts connected to said member for effecting the movement of said member; reversing gearing connected to said shafts for causing said shafts to rotate in opposite directions; a steplessly variable speed transmission connected to said reversing gearing for driving said reversing gearing, including a steplessly variable hydraulic transmission; a servomechanism connected to said hydraulic transmission for adjusting said hydraulic transmission, including a reciprocable cam; means normally urging said cam in one direction; an oscillatable arm connected to said reversing gearing and said servomechanism, said arm having a neutral position; means rendered effective when said arm is moved from its neutral position for moving said cam to actuate said servomechanism to thereby cause said member to be moved at a rate depending upon the position of said arm; a splined sleeve driven by each of said shafts; a plurality of discs splined to said sleeves; a plurality of discs alternating with said splined discs and having bores that clear the splines on said sleeves; resilient means for urging all of said discs in one direction to provide friction between alternate discs; another splined sleeve drivingly connected to each of said first-mentioned splined sleeves through gear reductions that cause said other splined sleeves to rotate at substantially slower speeds than said first-mentioned sleeves; disc arrangements on said other splined sleeves similar to those on said first-mentioned splined sleeves; switch actuating dogs on each of the non-splined discs; series arranged switches for corresponding non-splined discs for each of said shafts; distributor means connected to said switches for successively connecting said series arranged switches to means for rendering ineffective said reversing gearing; and means responsive to the simultaneous closing of said series arranged switches for indexing said distributor means.

11. In an apparatus including a member adapted to be moved in either direction along intersecting paths of motion; a rotatable table in position relative to said member such that said member moves along planes including the axis of rotation of said table; a variable speed transmission drivingly connected to said table for rotating said table; separate rotatable shafts connected to said member for effecting the movement of said member; reversing gearing connected to said shafts for causing said shafts to rotate in opposite directions; a steplessly variable speed transmission connected to said reversing gearing for driving said reversing gearing, including a steplessly variable hydraulic transmission; a servomechanism connected to said hydraulic transmission for adjusting said hydraulic transmission, including a reciprocable cam; means normally urging said cam in one direction; an oscillatable arm connected to said reversing gearing and said servomechanism, said arm having a neutral position; means rendered effective when said arm is moved from its neutral position for moving said cam to actuate said servomechanism to thereby cause said member to be moved at a rate depending upon the position of said arm; a rotatable flexible shaft extending axially through said arm; a handle for said arm connected to the one end of said flexible shaft; means rendered effective upon turning said handle to effect movement of said member along the path corresponding to the direction in which said handle is turned; a splined sleeve driven by each of said shafts; a plurality of discs splined to said sleeves; a plurality of discs alternating with said splined discs and having bores that clear the splines on said sleeves; resilient means for urging all of said discs in one direction to provide friction between alternate discs; another splined sleeve drivingly connected to each of said first mentioned splined sleeves through gear reductions that cause said other splined sleeves to rotate at substantially slower speeds than said first-mentioned sleeves; disc arrangements on said other splined sleeves similar to those on said first-mentioned splined sleeves; switch actuating dogs on each of the non-splined discs; series arranged switches for corresponding non-splined discs for each of said shafts; distributor means connected to said switches for successively connecting said series arranged switches to means for rendering ineffective said reversing gearing; and means responsive to the simultaneous closing of said series arranged switches for indexing said distributor means.

12. Apparatus comprising in combination, a member; a variable speed means connected to said member for moving said member along a path at varying rates of motion; another member; separate variable speed means connected to said other member for moving said other member along a path at varying rates of motion; a servomechanism connected to both of said variable speed means including a cam for steplessly adjusting the variable speed means of one of said members to provide a predetermined ratio of movements of said members relatively to each other; an epicyclic gearing means having one member drivingly connected to said one variable speed means, another member drivingly connected to the other variable speed means, and a third member connected to said cam; means normally urging said cam in one direction; an oscillatable arm having a neutral position; means rendered effective when said arm is moved from its neutral position for moving said cam to actuate said servomechanism to thereby cause said member to be moved at a rate depending upon the position of said arm; control means connected to said member for terminating the movement of said member along said path of travel comprising a first set of separate presettable means, one for each movement of said member along its path of motion within said program, all of said presettable means being movable in proportion to the movement of said member; a second set of separate presettable means, one for each of the first mentioned presettable means; means connected to said member for driving said second set of presettable means with said first set but at a substantially slower speed than said first mentioned set; electrical switches for each corresponding means in each set wired in series relation with respect to each other; distributor means connected to said switches for successively connecting said series arranged switches with means for rendering ineffective the variable speed means connected to said member; and means for preventing the movement of said member until said oscillatable arm is returned to its neutral position between successive movements of said member.

13. In an apparatus including a member adapted to be moved in either direction along intersecting paths of motion; a rotatable table in position relative to said member such that said member moves along planes including the axis of rotation of said table; a variable speed transmission drivingly connected to said table for rotating said table; separate rotatable shafts connected to said member for effecting the movement of said member; reversing gearing connected to said shafts for causing said shafts to rotate in opposite directions; a steplessly variable speed transmission connected to said reversing gearing for driving said reversing gearing, including a steplessly variable hydraulic transmission; a servomechanism connected to said hydraulic transmission for adjusting said hydraulic transmission, including a reciprocable cam; a variable speed control transmission drivingly connected to said table-rotating transmission; an epicyclic gearing train between the output of said control transmission and the output of said steplessly variable speed transmission for moving the cam of said servomechanism; means connected to said control variable speed transmission adapted to preset said control variable speed transmission for causing said servomechanism to adjust said hydraulic transmission; an oscillatable arm connected to said reversing gearing and said servomechanism, said arm having a neutral position; means rendered effective when said arm is on one side of its neutral position for causing said member to be moved at a rate depending upon the preset adjustment of said control variable speed transmission; means rendered effective when said arm is on the other side of its neutral position for causing said member to move at a rate depending upon the position of said arm and independent of said control variable speed transmission; a rotatable handle attached to said arm for determining the path and direction of movement of said member; a splined sleeve driven by each of said separate rotatable shafts; a plurality of discs splined to said sleeves; a plurality of discs alternating with said splined discs and having bores that clear the splines on said sleeves; resilient means for urging all of said discs in one direction to provide friction between alternate discs; switch actuating dogs on each of the non-splined discs; switches for the non-splined discs for each of said separate rotatable shafts; distributor means connected to said switches for successively connecting them to means for rendering ineffective said reversing gearing; and means responsive to the closing of said switches for indexing said distributor means.

References Cited in the file of this patent

UNITED STATES PATENTS

| | | |
|---|---|---|
| 2,876,650 | Sangster | Mar. 10, 1959 |
| 2,972,907 | Bullard | Feb. 28, 1961 |